(12) United States Patent
Taylor et al.

(10) Patent No.: US 8,207,481 B2
(45) Date of Patent: Jun. 26, 2012

(54) PROJECTILE GUIDANCE SYSTEM INCLUDING A COMPACT SEMI-ACTIVE LASER SEEKER

(75) Inventors: Byron Taylor, Tucson, AZ (US); Michael Schaub, Tucson, AZ (US); David Jenkins, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 521 days.

(21) Appl. No.: 12/427,681

(22) Filed: Apr. 21, 2009

(65) Prior Publication Data

US 2010/0264253 A1 Oct. 21, 2010

(51) Int. Cl.
  *F41G 7/22* (2006.01)
  *F42B 15/01* (2006.01)
  *F41G 7/00* (2006.01)
  *F42B 15/00* (2006.01)

(52) U.S. Cl. ....... 244/3.16; 244/3.1; 244/3.15; 250/200; 250/206; 250/206.1

(58) Field of Classification Search .......... 244/3.1–3.14, 244/3.15–3.3; 250/200, 206, 206.1; 102/382–384, 102/473, 501
See application file for complete search history.

(56) References Cited

U.S. PATENT DOCUMENTS

| | | | | | |
|---|---|---|---|---|---|
| 2,439,294 | A | * | 4/1948 | Hammond | 244/3.16 |
| 2,787,188 | A | * | 4/1957 | Berger | 244/3.17 |
| 2,931,912 | A | * | 4/1960 | Macleish | 244/3.16 |
| 2,961,545 | A | * | 11/1960 | Merlen et al. | 244/3.16 |
| 3,021,096 | A | * | 2/1962 | De Mott | 244/3.16 |
| 3,107,070 | A | * | 10/1963 | Willits et al. | 244/3.16 |
| 3,128,061 | A | * | 4/1964 | Chew | 244/3.16 |
| 3,194,966 | A | * | 7/1965 | Hulett | 244/3.16 |
| 3,226,058 | A | * | 12/1965 | Meneley | 244/3.17 |
| 3,296,443 | A | * | 1/1967 | Argyle | 244/3.16 |
| 3,455,243 | A | * | 7/1969 | Martin | 244/3.16 |
| 3,494,576 | A | * | 2/1970 | Lamelot | 244/3.16 |
| 3,496,367 | A | * | 2/1970 | Eckermann | 244/3.21 |
| 3,499,156 | A | * | 3/1970 | Bushnell et al. | 244/3.17 |
| 3,617,016 | A | * | 11/1971 | Bolsey | 244/3.16 |
| 3,741,111 | A | * | 6/1973 | Brenner | 244/3.16 |
| 3,743,216 | A | * | 7/1973 | Salonimer | 244/3.16 |
| 3,912,859 | A | * | 10/1975 | Christopherson | 244/3.16 |
| 3,944,167 | A | * | 3/1976 | Figler et al. | 244/3.16 |
| 3,964,695 | A | * | 6/1976 | Harris | 244/3.16 |
| 3,971,939 | A | * | 7/1976 | Andressen | 244/3.16 |
| 3,977,628 | A | * | 8/1976 | Barron | 244/3.16 |
| 4,006,356 | A | * | 2/1977 | Johnson et al. | 244/3.16 |
| 4,131,248 | A | * | 12/1978 | Berglund | 244/3.16 |
| 4,131,254 | A | * | 12/1978 | Underwood | 244/3.16 |
| 4,155,521 | A | * | 5/1979 | Evans et al. | 244/3.16 |

(Continued)

OTHER PUBLICATIONS

World Intellectual Property Organization, International Search Report and Written Opinion for International Application No. PCT/US2010/031774, mail date Dec. 17, 2010, pp. 1-7.

*Primary Examiner* — Bernarr Gregory
(74) *Attorney, Agent, or Firm* — Eric A. Gifford

(57) ABSTRACT

A guidance system may include an optical system to focus incident radiation onto a detector configured to generate at least one guidance signal in response to the focused incident radiation. The optical system may include a first lens having a first side and a second side, the first side consisting of a Fresnel lens formed on a generally convex surface and the second side being generally planar.

11 Claims, 4 Drawing Sheets

U.S. PATENT DOCUMENTS

| | | | | |
|---|---|---|---|---|
| 4,192,475 A | * | 3/1980 | Heinrich | 244/3.16 |
| 4,234,145 A | * | 11/1980 | Leiboff | 244/3.16 |
| 4,267,988 A | * | 5/1981 | Rodgers | 244/3.16 |
| 4,291,849 A | * | 9/1981 | Rodgers et al. | 244/3.22 |
| 4,436,260 A | * | 3/1984 | Donelan | 244/3.16 |
| 4,500,051 A | * | 2/1985 | Cottle et al. | 244/3.16 |
| 4,576,346 A | * | 3/1986 | Gauggel et al. | 244/3.16 |
| 4,701,602 A | * | 10/1987 | Schaefer et al. | 244/3.16 |
| 4,711,413 A | * | 12/1987 | Stessen | 244/3.16 |
| 4,733,609 A | * | 3/1988 | Goodwin et al. | 244/3.16 |
| 4,776,274 A | * | 10/1988 | Kriz et al. | 244/3.16 |
| 5,049,740 A | * | 9/1991 | Pines et al. | 244/3.16 |
| 5,259,568 A | | 11/1993 | Amon et al. | |
| 5,529,262 A | | 6/1996 | Horwath | |
| 6,262,800 B1 | | 7/2001 | Minor | |
| 7,022,962 B2 | * | 4/2006 | Ohtomo et al. | 250/206.1 |
| 7,185,845 B1 | | 3/2007 | Hartman | |
| 7,530,528 B2 | * | 5/2009 | Jenkins et al. | 244/3.16 |
| 7,554,076 B2 | * | 6/2009 | Wang et al. | 244/3.15 |
| 2003/0136901 A1 | | 7/2003 | Ohtomo et al. | |
| 2007/0290096 A1 | | 12/2007 | Jenkins et al. | |
| 2007/0295891 A1 | | 12/2007 | Wang et al. | |

* cited by examiner

PROJECTILE GUIDANCE SYSTEM INCLUDING A COMPACT SEMI-ACTIVE LASER SEEKER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to guidance systems for projectiles, missiles, and other ordinance that engages targets by detecting and following laser light reflected from the targets.

2. Description of the Related Art

Laser guided ordinance is commonly used to engage point targets with a high probability of success and minimal collateral damage. Such ordinance includes guided artillery projectiles, guided missiles, and guided bombs, all of which will be referred to herein as "projectiles".

A laser guided projectile typically includes a semi-active laser (SAL) seeker to detect laser radiation reflected from the intended target and to provide signals indicative of the target bearing such that the projectile can be guided to the target. The SAL may include an optical system to capture and focus the reflected laser radiation and a detector. In order to provide high sensitivity, the SAL optical system may have a large aperture and high optical efficiency.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
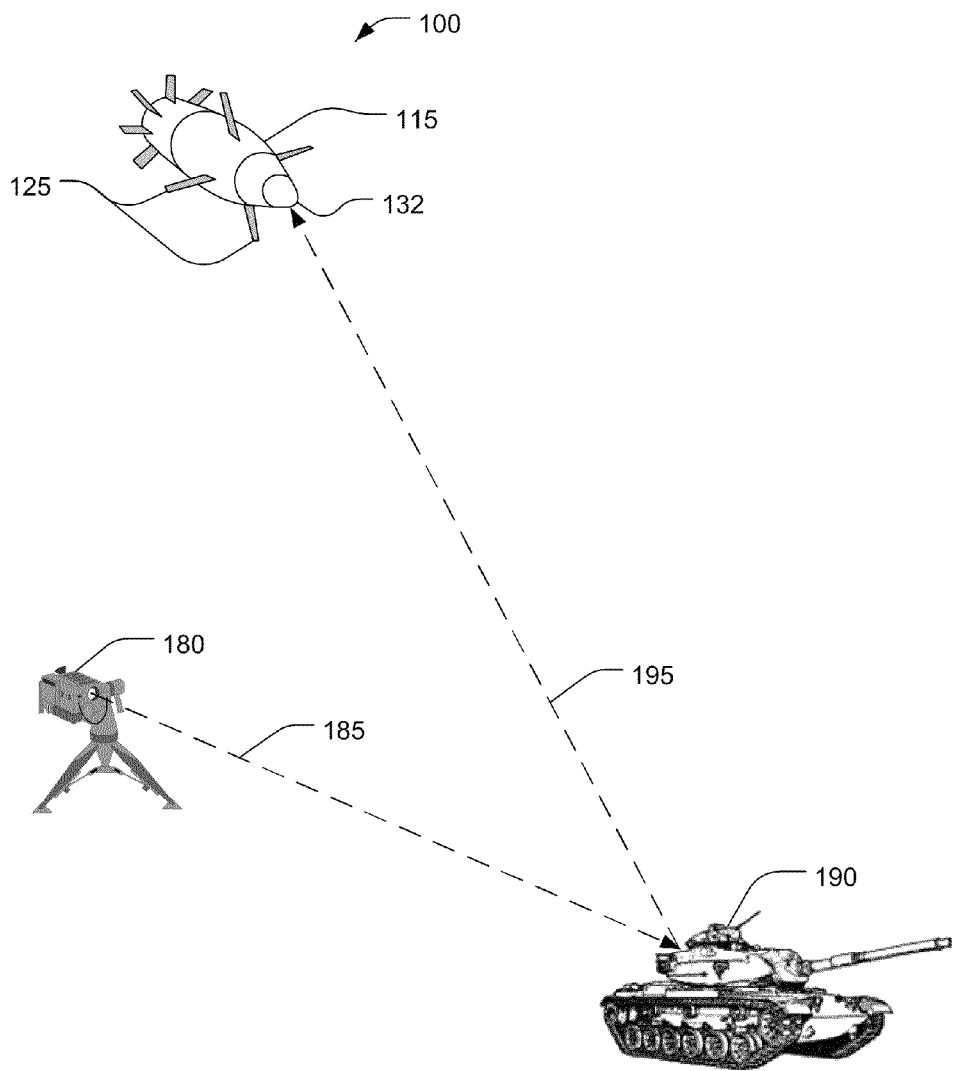
FIG. 1 is a schematic illustration of a laser guided projectile engaging a target.

Referring now to FIG. 1, a laser guided projectile 100 may engage a target 190 by detecting and following reflected laser radiation 195 from the target 190. In FIG. 1, the target 190 is represented as a tank, but may be another type of vehicle or a structure, building or other stationary object. The target 190 may be illuminated with laser radiation 185 from a laser designator 180. The laser designator 180 may be located on the ground, as shown in FIG. 1, or may be located in a vehicle or aircraft. The reflected laser radiation 195 may be a portion of the illumination laser radiation 185.

The laser guided projectile 100 may include a projectile body 115, control surfaces 125, and a guidance system. The guidance system may include a SAL seeker, of which only a transmissive dome 132 is visible in FIG. 1. The guidance system may include a flight control system to control the flight of the laser guided projectile 100 by manipulating one or more control surfaces 125 based on at least one guidance signal from the SAL seeker. In the example of FIG. 1, the control surfaces 125 are shown as canards, but may be fins, wings, ailerons, elevators, spoilers, flaps, air brakes or other controllable devices capable of affecting the flight path of the laser guided projectile 100.

Figure 2A:
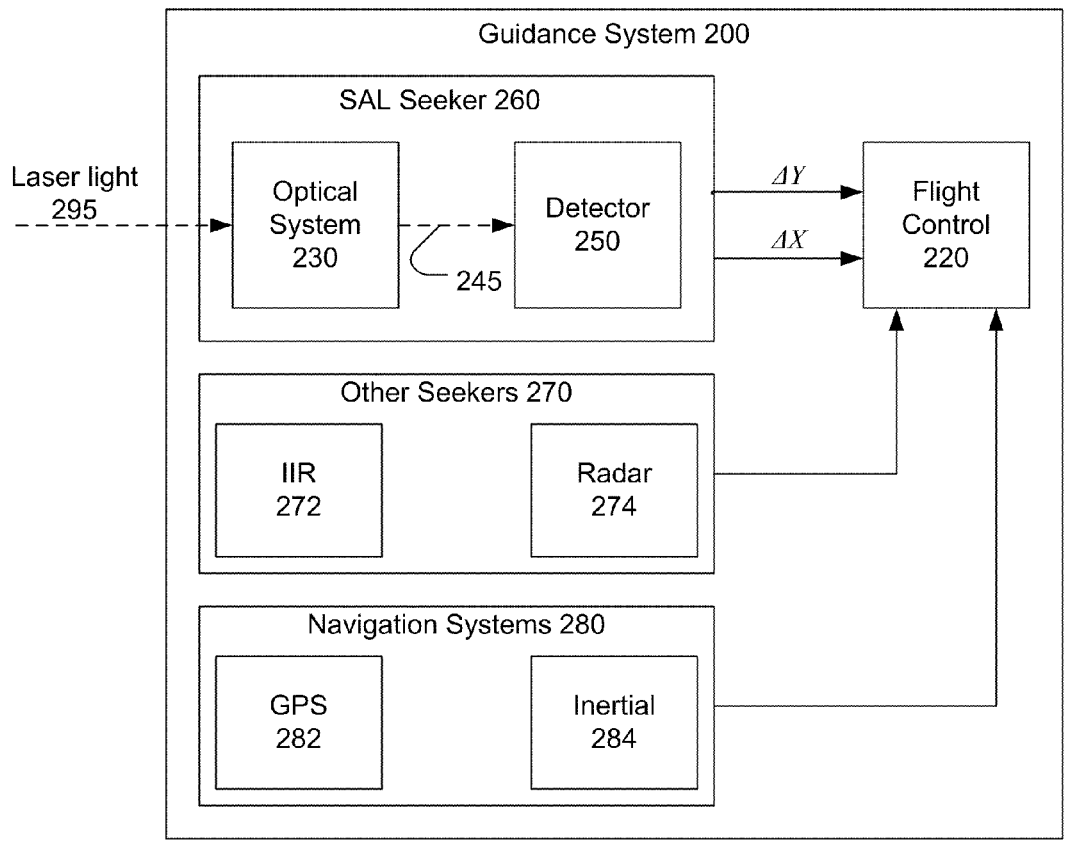
FIG. 2A is a block diagram of a guidance system.

Referring now to FIG. 2, a guidance system 200, which may be suitable for use in the projectile 100, may include a SAL seeker 260 and a flight control system 220. The SAL seeker 260 may include an optical system 230 to capture and condense or focus laser light 295 reflected from a target to form a laser light spot 245 on a detector 250. The SAL seeker 260 may provide at least one guidance signal indicative of a position of the laser light spot. The at least one guidance signal may include signals $\Delta X$ and $\Delta Y$ which are indicative of the position of the laser light spot 245 along two orthogonal axes.

The guidance system 200 may optionally include one or more additional seekers 270, such as an imaging infrared (IIR) seeker 272 and/or a radar seeker 274. The guidance system 200 may optionally include one or more navigation systems 280, such as a global positioning system (GPS) 282 and/or an inertial navigation system 284.

The flight control system 220 may receive at least one guidance signal from the SAL seeker 260. The flight control system 220 may also receive guidance signals from the additional seekers 270 and navigations systems 280 when present. In response to the guidance signals, the flight control system 220 may control the flight of the projectile such that the projectile arrives at a designated target.

The flight control system 220 may include one or more processors that accept at least one guidance signal from the SAL seeker and generate control signals to control the flight or trajectory of a projectile such as the projectile 100. The flight control system 220 may include control actuators to convert the control signals into physical movements of control surfaces such as the canards 125 shown in FIG. 1.

Figure 2B:
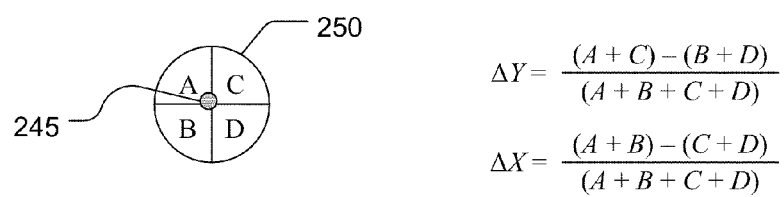
FIG. 2B is a schematic illustration of a detector.

FIG. 2B shows a frontal view of the detector 250 and the focused laser spot 245. The detector 250 may comprise four quadrants A, B, C, D. Each quadrant may produce a corresponding signal A, B, C, D in response to the laser energy incident upon each quadrant. Guidance signal $\Delta X$ may indicate an imbalance between the laser energy incident upon the left (quadrants A and B) and right (quadrants C and D) halves of the detector 250. Guidance signal $\Delta Y$ may indicate an imbalance between the laser energy incident upon the top (quadrants A and C) and bottom (quadrants B and D) halves of the detector 250. The terms "left", "right", "top", and "bottom" refer to the detector 250 as shown in FIG. 2B and do not imply any physical orientation of the detector 250 within a projectile such as the projectile 100. When the laser spot 245 is centered on the detector 250, the signals A, B, C, D may be essentially equal and the guidance signals $\Delta X$ and $\Delta Y$ may both be zero or nearly zero.

The position of SAL seeker 260 may be fixed within a projectile such as the projectile 100. For example, the SAL seeker 260 may be disposed within the projectile 100 such that an optical axis of the SAL seeker 260 is aligned with a longitudinal axis of the projectile 100. In this case, the laser spot 245 may be centered on the detector 250 when the longitudinal axis of the projectile 100 is pointed directly at the designated target. The SAL seeker 260 may be mounted on a gimbal within the projectile 100 such that the optical axis of the SAL seeker 260 may be rotated with respect to the longitudinal axis of the projectile 100. In this case, the laser spot 245 may be centered on the detector 250 when the optical axis of the SAL seeker 260 is pointed directly at the designated target.

Figure 3:
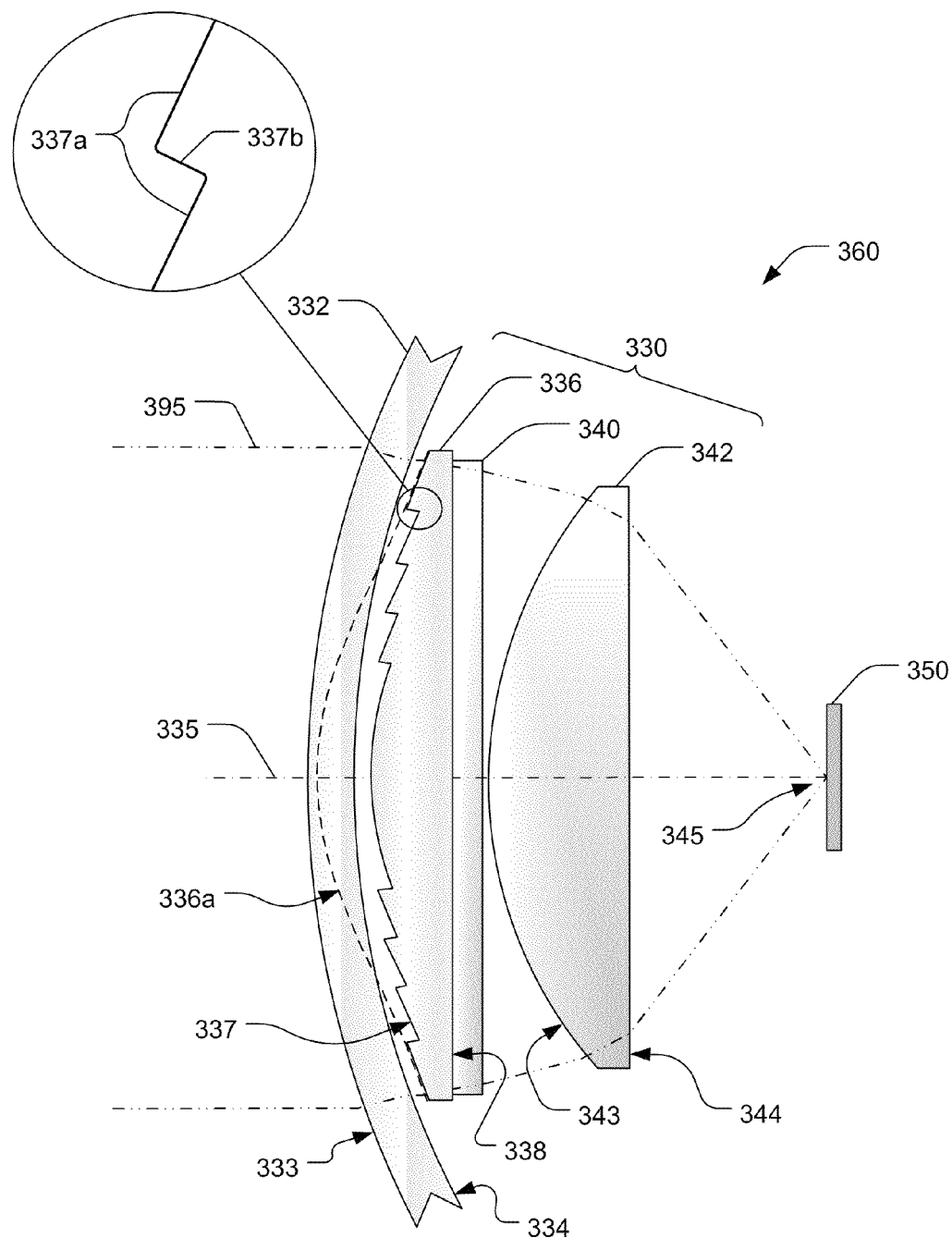
FIG. 3 is a partial cross-sectional view of a seeker.

Referring now to FIG. 3, an exemplary SAL seeker 360 may include an optical system 330 coupled to a detector 350, which may be a four-quadrant detector such as the detector 250. The SAL seeker 360 may also include circuitry (not shown in FIG. 3) that accept signals from the detector 350 and outputs at least one guidance signal for a projectile. The optical system 330 may include a first lens 336, a filter 340, and a second lens 342. The optical system 330 may be disposed to receive laser light 395 through a transmissive dome 332. The first lens 336 and the second lens 342 may, in combination, focus the incident laser light 395 to a spot 345 at a surface of the detector 350.

The dome 332 may be affixed to a body of a projectile (not shown in FIG. 3) such as the projectile 100. The dome 332 may be made of a transmissive material having sufficient mechanical integrity and abrasion resistance to withstand the launch and flight of the projectile. The term "transmissive" means that an element, such as the dome 332, transmits a substantial portion, though not necessarily all, of incident light at a specific wavelength or wavelength band of interest. The wavelength typically used for laser target designators is 1.06 microns although other wavelengths may be used.

The dome 332 may be made, for example, of glass, sapphire, aluminum oxynitride, or other transmissive material. The dome 332 may be an essentially spherical shell having a concave outer surface 333 essentially concentric with a concave inner surface 334. In this context and similar contexts, the term essentially is intended to mean "within reasonable manufacturing tolerances". The dome 332 may have a non-spherical shape selected, for example, to improve the aerodynamic performance of the projectile The optical system 330 and the detector 350 may be affixed to the body of the projectile or may be mounted on a gimbal (not shown in FIG. 3) which allows the optical system 330 and the detector 350 to collectively rotate about one or more axes that typically pass through the center of curvature of the dome 332.

The first lens 336 may have a first side 337 and a second side 338. The second side 338 may be, as shown in the example of FIG. 3, essentially planar and smooth. The first side 337 may be generally convex with a Fresnel lens formed on the generally convex surface. A Fresnel lens is a known optical component which emulates a continuously curved optical element (represented in FIG. 3 by the dashed line 336a) with a series of concentric annular rings 337a with a discontinuity 337b between each pair of adjacent rings. Each of the concentric rings 337a refracts incident light in the same manner as a corresponding annular portion of the emulated curved optical element. Each of the discontinuities 337b does not usefully refract incident light and thus effectively results in a loss of light transmission through the Fresnel lens. For clarity of illustration, the Fresnel lens shown in FIG. 3 has a central portion and only four annular rings 337a, but may have a much larger number of annular rings.

Fast Fresnel lenses, where a "fast" lens has a focal length that is small relative to the diameter of the lens, may have highly sloped annular rings 337a. Because the annular rings are highly sloped, fast Fresnel lenses may require either large discontinuities 337b between adjacent rings or a large number of concentric rings. In either case, the transmission of a fast Fresnel lens may be substantially degraded since the total area of the discontinuities 337b may form a significant fraction of the area of the Fresnel lens.

The first lens 336 may have an optical power that is the combination of the optical power provided by its generally plano-convex shape and the optical power provided by the Fresnel lens formed on the first side 337. For any desired net focal length of the first lens 336, the optical power contributed by the plano-convex shape may reduce the optical power that must be provided by the Fresnel lens. For any desired net focal length of the first lens 336, the Fresnel lens formed on the generally convex first side 337 may require fewer annular rings, and thus may provide higher transmission, than a Fresnel lens of the same net focal length formed on a flat substrate.

The generally convex first side 337 of the first lens 336 may be disposed proximate to the concave inner surface 334 of the dome 332. The convex first side of the first lens may be generally parallel to the concave inner surface 334, which is to say that a hypothetical curved line joining the tips of the annular rings 337a may be approximately parallel to the inner surface 334. The convex first side of the first lens may be disposed as close as practical to the concave inner surface 334 given manufacturing tolerances on the components and methods used to assemble the projectile.

The second side 338 of the first lens may be a spreader, such as a diffuser or a plurality of lenslets. Published Patent Application US 2007/0290096 A1 describes a guidance system including a SAL seeker which incorporates a spreader to reduce the effects of atmospheric scintillation.

When the SAL seeker 360 is intended to receive radiation from two or more different types of lasers having different wavelengths, the second side 338 of the first lens 336 may have diffractive surface features to provide wavelength compensation.

The filter 340 may be disposed adjacent to the planar second side 338 of the first lens 332. The filter 340 may be effective to prevent a substantial portion of incident light at wavelengths other than the specific wavelength or wavelength band of interest from reaching the detector 350. The filter 340 may include a wavelength selective substrate material and/or wavelength-selective coatings. The filter 340 may be adapted to prevent at least a substantial portion of sunlight from reaching the detector 350.

The second lens 342 may have a convex first surface 344 disposed adjacent to the filter 340 and a planar second surface 346. To minimize the cost of the second lens 342, the convex first surface 344 may be essentially spherical.

The first lens 334 and the second lens 342 may be made of materials that are highly transmissive and that have high refractive indices for the wavelength or wavelength band of interest. For example, the first lens 334 may be molded from a polymer material such as a polyetherimide material, which may have a refractive index greater than 1.60 at the wavelength of interest. For further example, the wavelength of interest may be 1.06 microns and the first lens 334 may be made from ULTEM, a polyetherimide material available from SABIC Innovative Plastics, which has a refractive index about 1.625 at a wavelength of 1.06 microns.

The second lens 342 may be made from a high index glass material which may have a refractive index greater than 1.8 at the wavelength of interest. For example, glass type S-NPH2, available from Ohara Optical Glass, which has a refractive index of about 1.880 at a wavelength of 1.06 microns, may be a suitable glass material for the second lens 342.

Figure 4:
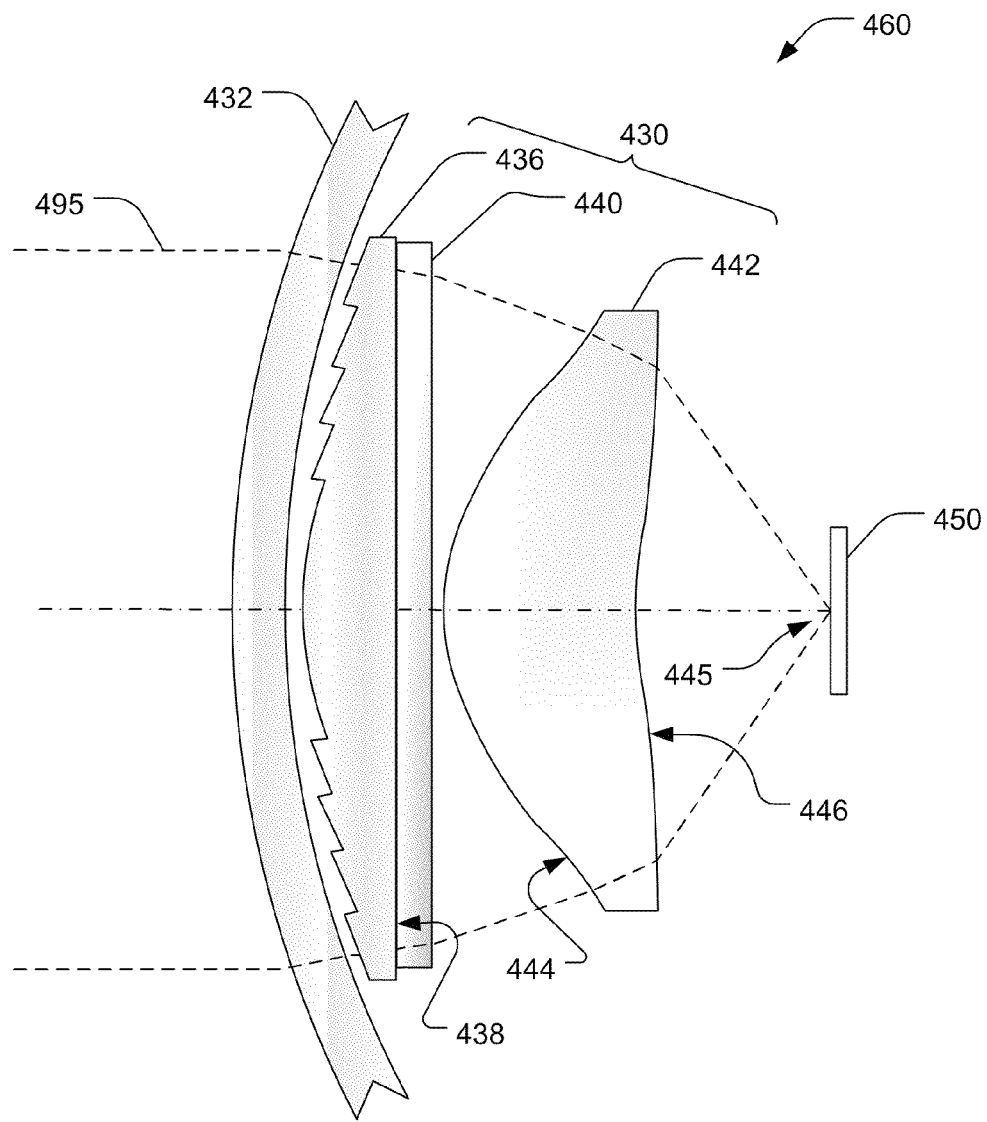
FIG. 4 is a partial cross-sectional view of a seeker.

Referring now to FIG. 4, an exemplary SAL seeker 460 may include an optical system 430 coupled to a detector 450, which may be a four-quadrant detector such as the detector 250. The optical system 430 may include a first lens 436, a filter 440, and a second lens 442. The optical system 430 may be disposed to receive laser light 495 through a transmissive dome 432. The dome 432, the first lens 436, the filter 440 and the detector 450 may be similar to the corresponding elements shown in FIG. 3 and the description of these elements will not be repeated.

The second lens 442 may have an aspheric first surface 444 facing the filter 440 and a second surface 446, which may also be aspheric, facing the detector 450. The first lens 434 and the second lens 442 may, in combination, focus incident laser light 495 to a spot 445 at a surface of the detector 450.

The second lens 442 may be made of a material that is highly transmissive and that has a high refractive index for the wavelength or wavelength band of interest. For example, the second lens 442 may also be molded from a glass material or from a polymer material such as ULTEM or another polyetherimide material, which may have a refractive index greater than 1.60 at the wavelength of interest.

The second side 438 of the first lens, the first side 444 of the second lens, and/or the second side 446 of the second lens may be a spreader, such as a diffuser or a plurality of lenslets. When the SAL seeker 460 is intended to receive radiation from two or more different types of lasers having different wavelengths, one or more of the second side 438 of the first lens the first side 444 of the second lens, and/or the second side 446 of the second lens may have diffractive surface features to provide wavelength compensation.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A guidance system, comprising:
   an optical system to focus incident radiation, the optical system comprising:
   a first lens having a first side and a second side, wherein the first side comprises a Fresnel lens including a series of concentric annular rings with a discontinuity between each pair of adjacent rings formed on a generally convex surface and the second side is generally planar
   said first lens having an optical power that is a combination of an optical power provided by its generally plano-convex shape and an optical power provided by the Fresnel lens
   a detector coupled to the optical system and configured to generate at least one guidance signal in response to the focused incident radiation.

2. The guidance system of claim 1, wherein the second side of the first lens comprises a spreader.

3. The guidance system of claim 1, wherein the second side of the first lens is characterized by diffractive surface features.

4. The guidance system of claim 1, the optical system further comprising a planar filter disposed adjacent to the second side of the first lens.

5. The guidance system of claim 4, the optical system further comprising:
   a second lens disposed between the planar filter and the detector.

6. The guidance system of claim 5, wherein the second lens has a spherical convex surface facing the planar filter and a planar surface facing the detector.

7. The guidance system of claim 5 wherein
   the first lens comprises a polymer material having a refractive index greater than or equal to 1.6 at a wavelength of the incident radiation
   the second lens comprises a glass material having a refractive index greater than or equal to 1.8 at the wavelength of the incident radiation.

8. The guidance system of claim 5, wherein the second lens has a first aspheric surface facing the planar filter and a second aspheric surface facing the detector.

9. The guidance system of claim 8, wherein
   the first lens comprises a polymer material having a refractive index greater than or equal to 1.6 at a wavelength of the incident radiation
   the second lens comprises a polymer material having a refractive index greater than or equal to 1.6 at the wavelength of the incident radiation.

10. The guidance system of claim 1, further comprising:
    a dome having a concave inner surface
    wherein the first side of the first lens is disposed proximate to and generally parallel to the concave inner surface of the dome.

11. The guidance system of claim 1, wherein the guidance system is disposed within a projectile, the guidance system further comprising:
    a flight control system to control the flight of the projectile in response to the at least one guidance signal.

* * * * *